United States Patent [19]
Crosley

[11] Patent Number: 4,924,665
[45] Date of Patent: May 15, 1990

[54] LAWN MOWER BLADE ASSEMBLY

[76] Inventor: Gilbert O. Crosley, P.O. Box 878, Starke, Fla. 32091

[21] Appl. No.: 286,033

[22] Filed: Dec. 19, 1988

[51] Int. Cl.$^5$ ............................................. A01D 34/73
[52] U.S. Cl. ........................................ 56/295; 56/12.7
[58] Field of Search .............. 56/295, 255, 12.7, 320.2

[56] References Cited

U.S. PATENT DOCUMENTS

| | | | |
|---|---|---|---|
| 3,208,209 | 9/1965 | Dunlap et al. | 56/295 |
| 4,121,405 | 10/1978 | Wolf | 56/295 X |
| 4,214,426 | 7/1980 | Lindblad | 56/295 |
| 4,369,618 | 1/1983 | Dell | 56/295 |
| 4,513,563 | 4/1985 | Roser et al. | 56/295 |

FOREIGN PATENT DOCUMENTS

| | | | |
|---|---|---|---|
| 685133 | 4/1964 | Canada | 56/295 |
| 2507200 | 2/1974 | Fed. Rep. of Germany | 56/295 |
| 2422651 | 12/1974 | Fed. Rep. of Germany | 56/295 |

OTHER PUBLICATIONS

*Popular Science*, Apr., 1971, p. 69, Lindsey, E. F., "Supersafe Rotary Mower: It's Bladeless".

*Primary Examiner*—Jerome W. Massie, IV
*Assistant Examiner*—David J. Bagnell
*Attorney, Agent, or Firm*—Arthur G. Yeager

[57] ABSTRACT

The blade assembly comprises a circular rotor body with an axial bore for attachment to a motor shaft of a lawn mower and a plurality of spaced cutting elements are attachable adjacent the rim of the body. The rotor body has a plurality of radially elongated passageways near the rim wherein cutting elements, formed as hook members, are positioned. The cutting elements have a radially extending leg for cutting grass and are generally pivotable when so mounted. The passageways are formed with respect to the dimensions of the cutting element to allow limited movement in the vertical direction. Another plurality of passageways are circular in shape and are formed very close to the rotary body rim to allow for greater vertical movement of the cutting elements installed therein to enhance its passage over uncuttable obstacles encountered in operation and thereby reduce the damage done to the cutting element.

19 Claims, 2 Drawing Sheets

LAWN MOWER BLADE ASSEMBLY

BACKGROUND OF THE INVENTION

1. Field of the Invention

The present invention relates to blades for rotary lawn mowers that utilize a blade that rotates in the horizontal plane and particularly to blades that utilize radially-extending cutting elements in lieu of the standard bar blade.

2. Prior Art

The typical lawn mower blade consists of a group of sharpened metal plates that rotate about an axis in the horizontal plane. The principal disadvantages of these older devices, namely, that they are dangerous to the user and hurl objects great distances at high velocity, have been addressed in lawn mower blades that employ filaments or similar elements that extend radially from the axis of rotation instead of the bar blade sharpened on the ends. The claimed advantages of such devices include the inability of a flexible cutting element to hurl a heavy object and the fact that filaments will do less harm to an operator's foot than a metal blade. In addition, filaments that structurally fail while in use do not constitute the same dangerous high-speed objects that a metal blade can become. For example, if a lawn mower is pushed over a rock or metal sprinkler head, the blade itself may break into several pieces which can be hurled at speeds of 200 miles per hour.

While filament or flexible cutting element type blades are improvements over the older "fan-like" metal blades, one principal disadvantage of these devices is the short lifetime of filaments, usually made of a plastic such as nylon.

In the event that the lawn mower is used over an area containing various objects such as pine cones or rocks, devices in the prior art that use flexible cutting elements rely on the fact that the filament will simply bend in the horizontal plane on impact and then bend back to the straight cutting position when the obstacle has passed. Alternatively, the cutting element filaments may be frictionally engaged via a mounting post on the rotor body that is used. This arrangement allows the filament to move in the horizontal plane upon impact with an object such as a rock but do not provide a simple method for the cutting element to return to its cutting position. This problem arises because the radial forces on the filament cannot cause the element to rotate against the frictional forces. That is to say, the filaments are not pivotably mounted on the rotating rotor blade. This problem exists with the blade discussed in U.S. Pat. No. 3,208,209. In U.S. Pat. No. 3,208,209 wires are used as cutting elements and do not rotate around their respective mounting posts during a normal cutting operation. If the cutting elements are rotated because of impact with foreign objects, it would be necessary to stop the mower and return the elements to their normally radially extending position by loosening the mounting bolts, manually returning the cutting elements to their normal position and then re-tightening the bolts. Such a procedure is time-consuming at the very least. Furthermore, if the respective mounting bolt is not adequately tightened there exists the distinct possibility that the filaments could come loose and be thrown by the rotating body or knocked off the respective mounts in subsequent collisions. Also, the replacement of the cutting elements is a time-consuming job involving the unloosening of a plurality of bolts and replacement of the corresponding element. Finally, the cost and weight of a lawn mower blade are important considerations and the use of a bolt for each respective cutting element should not be required.

What is most desirable in a lawn mower blade is a device where the cutting elements are freely pivotable in the horizontal plane and also pivotable in the vertical plane. Thus, a cutting element can ride up and over a particular foreign object or pivot backwards in the event of a collision and quickly return to the normal horizontally extending cutting position after the object has passed. The improved lawn mower blade should be at least equal to or lighter in weight than conventional blades and should cost no more. In addition, and very importantly, the cutting elements should be practically impossible to install incorrectly and should be installable quickly and easily. The blade assembly should have no protrusions on the edges or lower surface that can engage objects or injure an operator's foot that is accidentally placed underneath the mower housing. Such protrusions may be connecting bolts, nuts or the like which extend below a solid rotor or plate. Also, the cutting elements should be quickly and easily installable without the aid of tools and without having access to the upper surface of the rotor. None of the devices known or disclosed in the prior art are satisfactory from the view of cost, weight, safety and ease of use.

SUMMARY OF THE INVENTION

In accord with one aspect of the present invention, there is provided an improved lawn mower blade assembly adapted to rotate in a substantially horizontal plane about a vertically-disposed motor shaft of a lawn mower which comprises an enlarged circular rotor body having means for attachment to a motor shaft of a lawn mower and a smooth circular rim adapted to be spaced from a housing of a lawn mower. A plurality of spaced cutting elements, projecting radially outwardly from the rim during normal rotation of the rotor body by a motor of a lawn mower, are attached by pivot means between each element and adjacent the rim for freely mounting each cutting element for unobstructed pivotable movement of each element during normal rotation of the rotor body whereby uncuttable obstructions encountered by the cutting elements causes the elements to freely move about the pivot means. The pivot means preferably includes a plurality of spaced passageways in the rotor body and adjacent the rim thereof. Each cutting element is elongated and has opposite end portions, one of which includes a hook member, having a pair of legs with one leg being substantially greater in length than the other leg and extends radially outwardly from the rim when the hook member is disposed through its respective passageway and the rotor body is being rotated. The shorter leg is above the rotor body and the longer leg is disposed therebelow, and both legs are disposed substantially horizontally when the rotor body is rotated.

Other aspects are provided in which the rotor body includes a smooth planar lower surface having no downwardly extending protuberances and an upper surface, with the first leg engaging the upper surface when the rotor body is at rest for limiting the downward position of the other end portion of the cutting element to be above ground thereby positioning longer leg at an acute angle with respect to the plane of rotation of the rotor body. The hook member includes a connecting leg between the legs which is sufficiently long to allow the longer leg to be inclined upwardly from the plane of rotation of the rotor body for enhancing passage of the longer leg over an object encountered by the cutting element to minimize damage to the longer leg. Each of the cutting elements is formed of a unitary cylindrical spring wire. The shorter leg is displaced angularly in plan from vertical alignment from the longer leg to provide an increased entranceway between the legs to allow the shorter leg to be positioned through the passageway without material deformation of the hook member. Also, there are two types of passageways used, one of which is radially elongated for allowing radial movement of the hook member while the first leg of the hook member is positioned through the passageway without material deformation of the hook member. The other type of passageway is circular in shape and located closer to the rim and allows greater vertical movement of the cutting element and thus enhances the passage of the element over uncuttable obstacles encountered by the mower blade assembly.

Additional aspects include the provision of a plurality of spaced air passageways through the rotor body for creating a suction for the grass cut by the cutting elements upwardly and outwardly through an opening in a housing of a lawn mower when the rotor body is being rotated. A plurality of spaced air fins on the upper surface adjacent the air passageways aids in increasing the air flow. The fins are upwardly inclined members positioned forwardly of respective air passageways with respect to the direction of rotation of the rotor body. The fins direct air adjacent the upper surface of the rotor body upwardly for creating a lower pressure above the rotor body with respect to the air pressure below thereby creating an upwardly directed suction for increasing the flow of air and cut grass. The fins are preferably displaced angularly rearwardly of radial alignment to direct air flow outwardly.

BRIEF DESCRIPTION OF THE DRAWINGS

The novel features which are believed to be characteristic of this invention are set forth with particularity in the appended claims. The invention itself, however both as to its organization and method of operation, together with further objects and advantages thereof, may best be understood by reference to the following description taken in connection with the accompanying drawings, in which:

DETAILED DESCRIPTION OF THE PREFERRED EMBODIMENT

Figure 1:
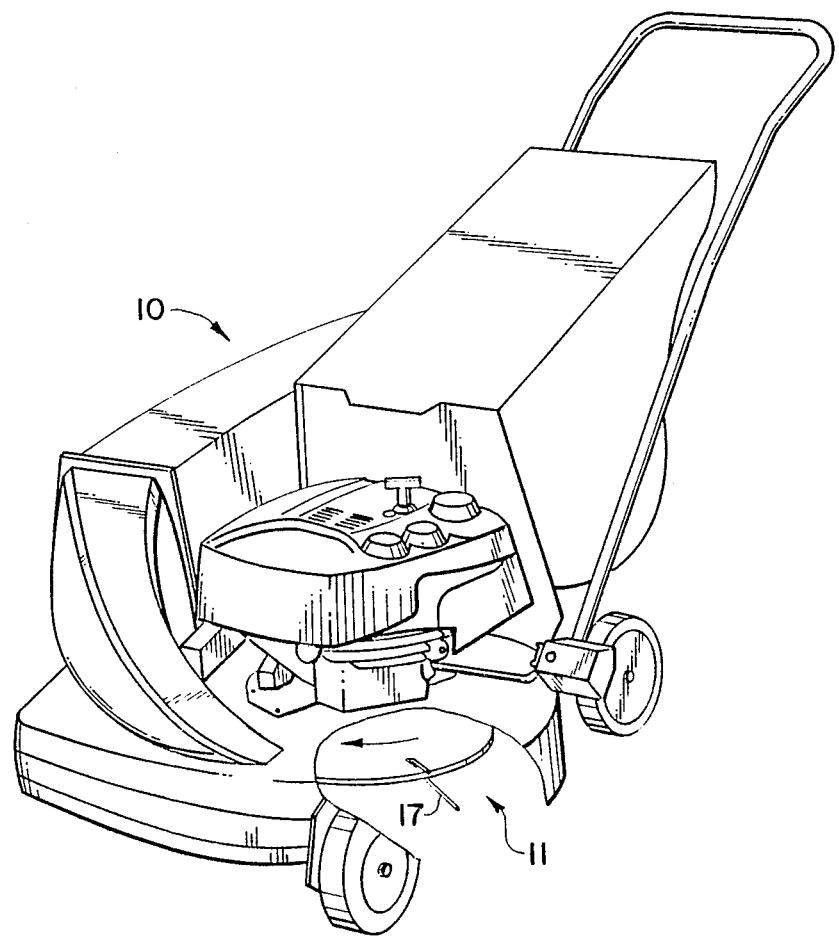
FIG. 1 is a perspective view of a lawn mower with partly broken away housing, that employs the improved lawn mower blade assembly in accord with the present invention.
Figure 2:
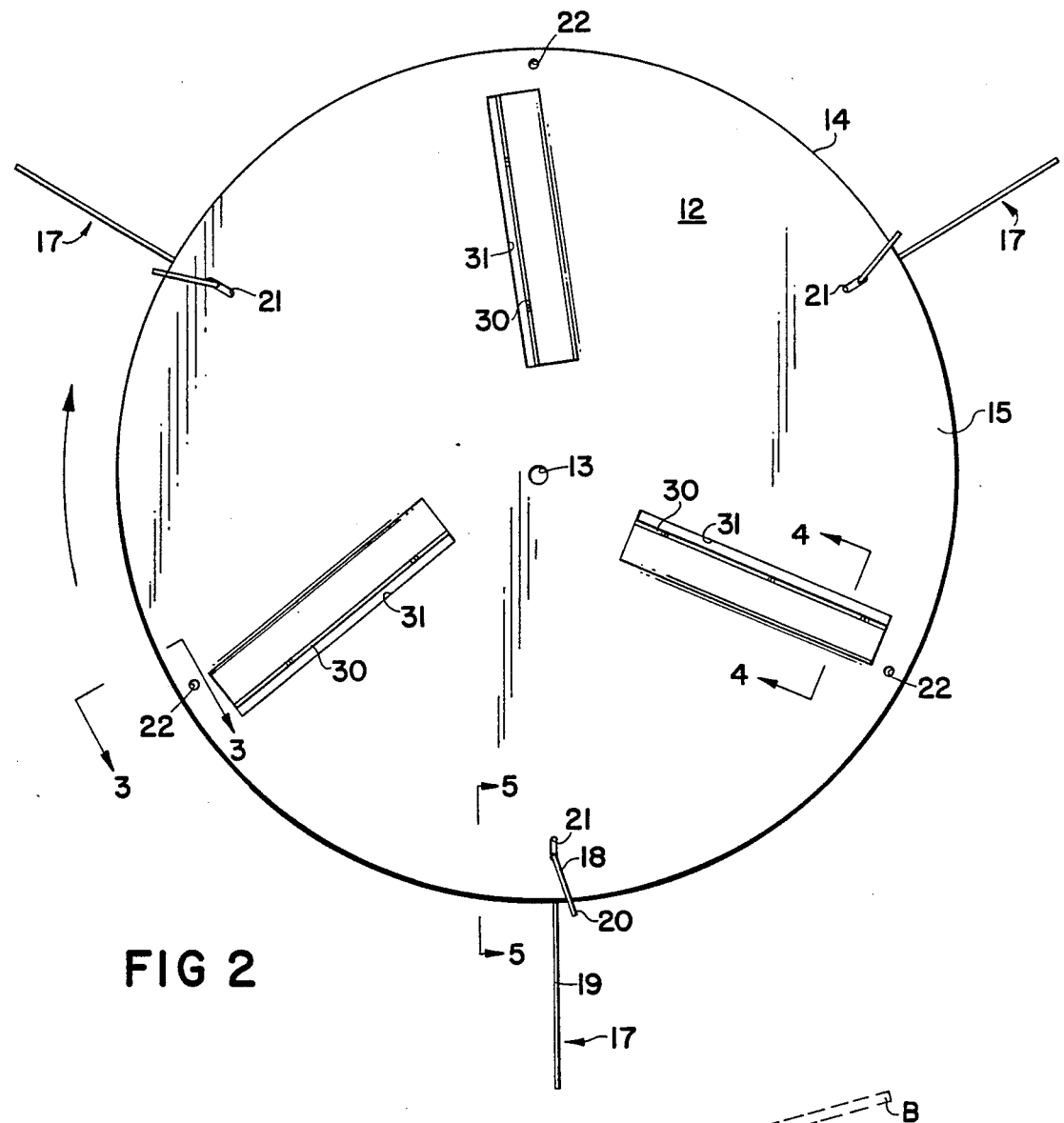
FIG. 2 is a plan view of the lawn mower blade assembly of FIG. 1.

Referring now to the drawings, a lawn mower utilizing the improved lawn mower blade assembly in accord with the present invention is depicted by the numeral 10 in FIG. 1. The lawn mower blade assembly 11 includes a circular rotor body 12 with an axial bore 13 for use in attaching the rotor body 12 to the motor shaft (not shown) of the lawn mower 10. As illustrated in FIG. 2, the axial bore 13 is a small diameter hole drilled through the rotor body 12 which is fabricated from steel plate. As understood in the art, additional bolt holes (not shown) may be needed in order to couple the rotor body 12 to a particular lawn mower motor. Rotor body 12 also has a smooth circular rim 14 and top planar surface 15 and bottom planar surface 16. As also understood in the art, the central area of rotor body 12 may be press-raised from the horizontal plane for attachment to a particular lawn mower 10.

The lawn mower blade assembly 11 employs one or more cutting elements 17 which are made of predetermined lengths of cylindrical piano wire formed as a hook member. The hook member has a first short leg 18 and a longer radially extending second leg 19 that is used for a cutting operation. Each cutting element 17 is mounted adjacent the rotor body rim 14 in a manner to be freely pivotable in the horizontal plane. Preferably, the cutting elements 17 are mounted with the first leg 18 above the rotor body 12 and with the second leg 19 below as clearly shown in FIGS. 3 and 5. This arrangement keeps first leg 18 away from an operator's foot. The cutting elements 17 are mounted in one of two group types of passageways 21 and 22. The first group of passageways 21 are elongated slots in the radial direction whereas passageways 22 are circular in shape and located nearer to the rim 14 for reasons hereinbelow more fully explained.

Figure 5:
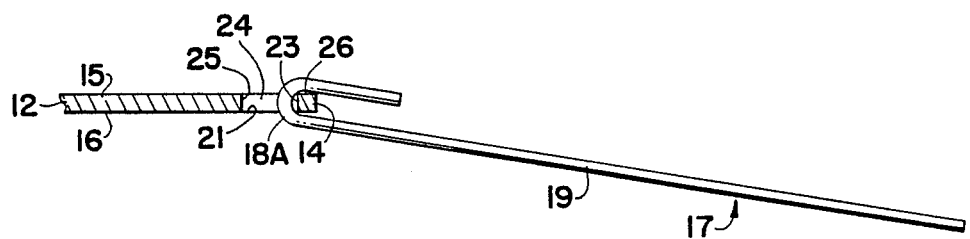
FIG. 5 an enlarged cross-sectional view of the blade assembly of FIG. 2 taken along line 5—5 and illustrating a cutting element attached to a second type of passageway spaced inwardly of the circumferential edge of the rotor body of the blade assembly.

Elongated passageways 21 have a radially outer or front wall 23, side walls 24, and an inner or rear wall 25. The dimensions of the walls 23–25 are chosen to allow for slight radial movement and vertical pivoting of an installed cutting element 17 and the ease of attaching same to rotor body 12. Cutting element 17 is installed in a passageway 21 from underneath by pushing first leg 18 upwardly through the passageway. Preferably, cutting element 17 is formed by bending a length of wire approximately 180° to place first leg 18 above second leg 19. As shown in FIG. 5, curved wire portion 18A acts as a connecting leg which will rest against outer wall 23 during operation. Further, first leg 18 is bent angularly about 17° in plan to allow cutting element 17 to be more readily installed in passageway 21 or 22 without material deformation thereof. The angular bend of first leg 18 increases the entranceway between first and second legs 18 and 19 for ease of installation of a cutting element 17. Once installed, first leg 18 will rest on the area 26 which represents that part of rotor body upper surface 15 from front wall 23 to rim 14. This arrangement limits the downward slope of leg 19 from the horizontal so that leg 19 does not touch the ground even during non-rotation thereof. An alternative construction of cutting element 17 is to provide a bend of less than 180° for ease of installation. This arrangement will result in a greater downward slope of leg 19 when it is at rest.

During the operation of a lawn mower 10 the cutting element 17 will be held in the horizontal plane by the radial forces associated with the rotation of rotor body 12. The cutting element 17 is freely pivotable in the horizontal plane upon impact with an object such as a rock or pine cone. The cutting element 17 is also pivotable in the vertical direction a distance determined by the precise dimensions of passageway 21, cutting element 17, and the rotor body 12, including the radial distance across area 26 and the length of leg 18A. The centrifugal force of rotation will return the cutting element 17 to its radially extending horizontal position quickly after it has been displaced from the horizontal in any direction for any reason.

A second group of passageways 22 are in the form of small circular holes located very close to rim 14. Area 28 is that part of rotor body upper surface 15 from the outermost point 29 of a passageway 22 to the rim 14. A cutting element 17 is installed in a passageway 22 in the same manner as for passageways 21. The vertical movement of cutting element 17 when installed in passageway 22 is only limited by the length of the curved portion, depicted as connecting leg 18A, of the hook member formed by bending the wire to define the legs 18 and 19 with respect to the radial distance across area 28, i.e., such radial distance being greater than the normal distance between legs 18 and 19.

Figure 3:
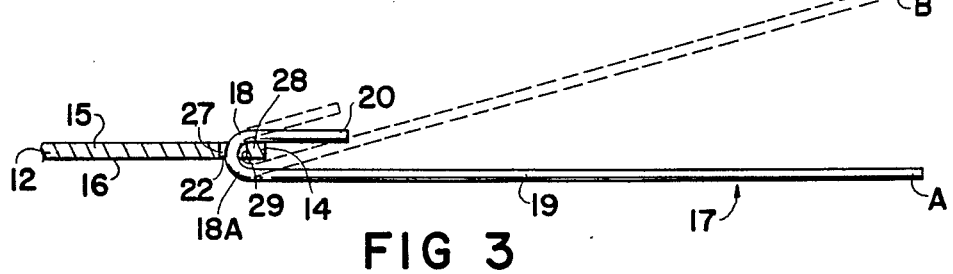
FIG. 3 is an enlarged cross-sectional view of the blade assembly of FIG. 2 taken along line 3—3 and further illustrating a rotating cutting element attached to one type of passageway closely adjacent the circumferential edge of the rotor body of the blade assembly.

Installation of cutting elements 17 in the passageways 22 allows the cutting element 17 greater upward vertical movement than when placed in passageway 21. This arrangement allows cutting element 17 to move from full line position "A" in FIG. 3 to broken line position "B" in order to pass over obstacles and limit damage to the element 17 when the lawn mower 10 is used in areas where there may be a large number of obstacles such as pine cones. The cutting element 17 can be knocked backwards under lower surface 16 or knocked upwardly to pivot vertically when encountering obstacles. In FIG. 3, cutting element 17 is shown in the plane of rotation of rotor body 12 as it would appear in operation. At rest, the cutting element 17 would hang downwardly and probably would touch the ground.

In the preferred embodiment of the present invention, the rotor body 12 includes both types of passageways 21 and 22 to allow the operator the option of placing cutting elements 17 where appropriate for a particular task.

Figure 4:
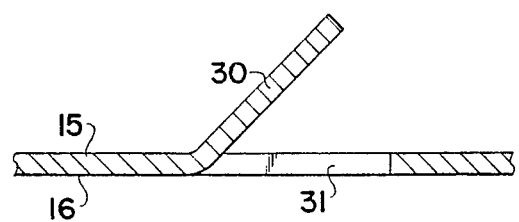
FIG. 4 is a cross-sectional view of the blade assembly of FIG. 2 taken along line 4—4.

With reference now to FIGS. 2 and 4, the preferred embodiment of the lawn mower blade assembly 11 also includes a plurality of spaced air lifting fins 30 that are displaced angularly from alignment with the radius of rotor body 12. The fins 30 are preferably formed integrally with rotor body 12 by a cutting and stamping operation used in forming the rotor body 12 from a piece of flat plate steel. It is to be understood that rotor body 12 could also be formed from any suitable plastic material, such as by injection molding or the like. Air passageways 31 result from the forming of the fins 30 and direct air upward and outward and assist in moving cut grass upwardly into a grass collection bag mounted outwardly of the housing of the mower. Fins 30 also assist in the control of the flow of cut grass by creating a differential pressure across the rotor body 12 from below to above air passageways 31 and thus greatly increase upward air flow. Additional air passages (not shown) may be provided through the rotor body 12 if necessary.

Preferably, the rotor body 12 is a smooth metal or plastic plate with no downwardly extending protrusions of any kind on the bottom surface 16. This design, in conjunction with the freely pivotable nature of cutting elements 17 and the placement of leg 18 above rotor body 12, substantially overcomes the possibility of serious injury to an operator's foot placed accidentally beneath the mower 10. The smooth rim 14 also decreases the chances of potential injury to the feet and hands. In addition, the smooth rim 14, bottom surface 16 and freely pivotable nature of the cutting elements 17 substantially prevents the mower 10 from hurling objects that constitute a substantial risk of injury. Finally, cutting elements 17 are easy to install without tools and/or access to the upper surface of the rotor body, inexpensive to manufacture, and are durable in use.

While the invention has been described with respect to certain specific embodiments, it will be appreciated that many modifications and changes may be made by those skilled in the art without departing from the spirit of the invention. It is intended, therefore, by the appended claims to cover all such modifications and changes as fall within the true spirit and scope of the invention.

What is claimed as new and what it is desired to secure by Letters Patent of the United States is:

1. An improved lawn mower blade assembly adapted to rotate in a substantially horizontal plane about a vertically-disposed motor shaft of a lawn mower comprising an enlarged circular rotor body having means for attachment to a motor shaft of a lawn mower and a smooth circular rim adapted to be spaced from a housing of a lawn mower, a plurality of spaced cutting elements projecting radially outwardly from said rim during normal rotation of said rotor body for a motor of a lawn mower, pivot means between each said element and adjacent said rim for freely mounting each said scutting element for unobstructed pivotable movement of each said element during normal rotation of said rotor body whereby uncuttable obstructions encountered by said cutting elements causes said elements to freely move upwardly and/or rearwardly about said pivot means, said elements being disposable entirely inboard of said rim when said rim is not rotating and during encounter with uncuttable obstructions, said pivot means including a plurality of spaced passageways in said rotor body and adjacent said rim thereof, each said cutting element being elongated and having opposite end portions, one of said end portions including a hook member, said hook member having a first leg and a second leg and a connecting portion therebetween, said second leg being substantially greater in length than said first leg and extending radially outwardly from said rim when said connecting portion of said hook member is disposed through respective said passageway and said rotor body is being rotated, said pivot means including said connecting portion of said hook member.

2. In the lawn mower blade assembly of claim 1 wherein each of said cutting elements is a rigid member.

3. In the lawn mower blade assembly of claim 1 wherein each of said cutting elements is a cylindrical member.

4. In the lawn mower blade assembly of claim 1 wherein each of said cutting elements is formed of a unitary spring wire.

5. An improved lawn mower blade assembly adapted to rotate in a substantially horizontal plane about a vertically disposed motor shaft of a lawn mower comprising an enlarged circular rotor body having means for attachment to a motor shaft of a lawn mower and a smooth circular rim adapted to be spaced from a housing of a lawn mower, said rotor body further having an upper surface and a smooth planar lower surface having no downwardly extending protuberances, a plurality of spaced cutting elements each having a hook portion and projecting radially outwardly from said rim during normal rotation of said rotor body by a motor of a lawn mower, pivot means between each said element and adjacent said rim for freely mounting each said cutting element for unobstructed pivotable movement of each said element during normal rotation of said rotor body whereby uncuttable obstructions encountered by said cutting elements causes said elements to freely move about said pivot means, said pivot means consisting of a plurality of spaced passageways in said rotor body and adjacent said rim and a respective said hook portion of each said cutting element disposed in respective said passageway, each said cutting element being a rigid member, said elements being disposable entirely inboard of said rim when said rim is not rotating and during encounter with uncuttable obstructions.

6. In the lawn mower blade assembly of claim 5 wherein each of said cutting elements is a unitary cylindrical spring wire.

7. In the lawn mower blade assembly of claim 5 wherein said rotor body has a plurality of spaced air passageways therethrough for creating a suction for the grass cut by said cutting elements upwardly and outwardly through an opening in a housing of a lawn mower when said rotor body is being rotated.

8. In the lawn mower blade assembly of claim 7 wherein said rotor body further includes a plurality of spaced air fins on said upper surface adjacent said air passageways for directing air flow in a housing of a lawn mower upwardly and outwardly through an opening in a housing of a lawn mower when said rotor body is being rotated.

9. In the lawn mower blade assembly of claim 8 wherein each said fin is an upwardly inclined member positioned forwardly of respective said air passageways with respect to the direction of rotation of said rotor body, said fins directing air adjacent said upper surface of said rotor body upwardly for creating a lower pressure above said rotor body with respect to the air pressure below thereby creating an upwardly directed suction for increasing the flow of air and cut grass, said fins being displaced angularly rearward in plan from alignment with the radius of said rotor body with respect to the direction of rotation of said rotor body.

10. An improved lawn mower blade assembly adapted to rotate in a substantially horizontal plane about a vertically-disposed motor shaft of a lawn mower comprising an enlarged circular rotor body having means for attachment to a motor shaft of a lawn mower and a smooth circular rim adapted to be spaced from a housing of a lawn mower, a plurality of spaced cutting elements projecting radially outwardly from said rim during normal rotation of said rotor body by a body of a lawn mower, pivot means between each said element and adjacent said rim for freely mounting each said cutting element for unobstructed pivotable movement of each said element during normal rotation of said cutting elements causes said elements to freely move about said pivot means, said pivot means including a plurality of spaced passageways in said rotor body and adjacent said rim thereof, each said cutting element being elongated and having opposite end portions, one of said end portions including a hook member, said hook member having a first leg and a second leg, said second leg being substantially greater in length than said first leg and extending radially outwardly from said rim when said hook member is disposed through respective said passageway and said rotor body is being rotated, said hook member being disposed with said first leg above said rotor body and said second leg below said rotor body, said legs being disposed substantially horizontally when said rotor body is rotated.

11. In the lawn mower blade assembly as in claim 10 wherein said rotor body includes an upper surface, said first leg engaging said upper surface of said rotor body when said rotor body is at rest for limiting the downward position of said other end portion of said cutting element to be above ground thereby positioning said second leg at an acute angle with respect to the plane of rotation of said rotor body.

12. An improved lawn mower blade assembly adapted to rotate in a substantially horizontal plane about a vertically-disposed motor shaft of a lawn mower comprising an enlarged circular rotor body having means for attachment to a motor shaft of a lawn mower and a smooth circular rim adapted to be spaced from a housing of a lawn mower, a plurality of spaced cutting elements projecting radially outwardly from said rim during normal rotation of said rotor body by a motor of a lawn mower, pivot means between each said element and adjacent said rim for freely mounting each said cutting element during normal rotation of said rotor body whereby uncuttable obstructions encountered by said cutting elements causes said elements to freely move about said pivot means, said pivot means including a plurality of spaced passageways in said rotor body and adjacent said rim thereof, each said cutting element being elongated and having opposite end portions, one of said end portions including a hook member, said hook member having a first leg and a second leg, said second leg being substantially greater in length than said first leg and extending radially outwardly from said rim when said hook member is disposed through respective said passageway and said rotor body is being rotated, said hook member including a connecting leg between said first and second legs and being sufficiently long to allow said second leg to be inclined upwardly from the plane of rotation of said rotor body for enhancing passage of said second leg over an object encountered by said cutting element to minimize damage to said second leg.

13. An improved lawn mower blade assembly adapted to rotate in a substantially horizontal plane about a vertically-disposed motor shaft of a lawn mower comprising an enlarged circular rotor body having means for attachment to a motor shaft of a lawn mower and a smooth circular rim adapted to be spaced from a housing of a lawn mower, a plurality of spaced cutting elements projecting radially outwardly from said rim during normal rotation of said rotor body by a motor of a lawn mower, pivot means between each said element and adjacent said rim for freely mounting each said cutting element during normal rotation of said rotor body whereby uncuttable obstructions encountered by said cutting elements causes said elements to freely move about said pivot means, said pivot means including a plurality of spaced passageways in said rotor body and adjacent said rim thereof, each said cutting element being elongated and having opposite end portions, one of said end portions including a hook member, said hook member having a first leg and a second leg, said second leg being substantially greater in length than said first leg and extending radially outwardly from said rim when said hook member is disposed through respective said passageway and said rotor body is being rotated, said passageway being radially elongated for allowing radial movement of said hook member while said first leg of said hook member is positioned through said passageway without material deformation of said hook member.

14. An improved lawn mower blade assembly adapted to rotate in a substantially horizontal plane about a vertically-disposed motor shaft of a lawn mower comprising an enlarged circular rotor body having means for attachment to a motor shaft of a lawn mower and a smooth circular rim adapted to be spaced from a housing of a lawn mower, a plurality of spaced cutting elements projecting radially outwardly from said rim during normal rotation of said rotor body by a body of a lawn mower, pivot means between each said element and adjacent said rim for freely mounting each said cutting element during normal rotation of said rotor body whereby uncuttable obstructions encountered by said cutting elements causes said elements to freely move about said pivot means, said pivot means including a plurality of spaced passageways in said rotor body and adjacent said rim thereof, each said cutting element being elongated and having opposite end portions, one of said end portions including a hook member, said hook member having a first leg and a second leg, said second leg being substantially greater in length than said first leg and extending radially outwardly from said rim when said hook member is disposed through respective said passageway and said rotor body is being rotated, said cutting elements being formed of a unitary spring wire, said first leg being displaced angularly in plan from vertical alignment from said second leg to provide an increased entranceway between said legs to allow said first leg to be positioned through said passageway without material deformation of said hook member.

15. An improved lawn mower blade assembly adapted to rotate in a substantially horizontal plane about a vertically disposed motor shaft of a lawn mower comprising an enlarged circular rotor body having means for attachment to a motor shaft of a lawn mower and a smooth circular rim adapted to be spaced from a housing of a lawn mower, said rotor body further having an upper surface and a smooth planar lower surface having no downwardly extending protuberances, a plurality of spaced cutting elements projecting radially outwardly from said rim during normal rotation of said rotor body by a motor of a lawn mower, pivot means between each said element and adjacent said rim for freely mounting each said cutting element for unobstructed pivotable movement of each said element during normal rotation of said rotor body whereby uncuttable obstructions encountered by said cutting elements causes said elements to freely move about said pivot means, each said cutting element being a rigid member, said pivot means including a plurality of spaced passageways in said rotor body and adjacent said rim thereof, each said cutting element being elongated and having opposite end portions, one of said end portions including a hook member having a first leg and a second leg, said second leg being substantially greater in length than said first leg, and further having a connecting leg between said first and second legs, each said passageway being radially elongated and having an inner wall, an outer wall, and two side walls, said connecting leg disposed substantially vertically against said outer wall when said rotor body is being rotated for positioning said first and second legs substantially horizontally when said rotor body is rotated, said second leg extending radially outwardly from said rim.

16. In the lawn mower blade assembly as in claim 15 wherein said first leg engages said upper surface of said rotor body when said rotor body is at rest for limiting the downward position of said other end portion of said cutting element to be above ground thereby positioning said second leg at an acute angle with respect to the plane of rotation of said rotor body.

17. In the lawn mower blade assembly of claim 15 wherein said connecting leg being sufficiently long to allow said second leg to be inclined upwardly from the plane of rotation of said rotor body for enhancing passage of said second leg over an object encountered by said cutting element to minimize damage to said second leg.

18. An improved lawn mower blade assembly adapted to rotate in a substantially horizontal plane about a vertically disposed motor shaft of a lawn mower comprising an enlarged circular rotor body having means for attachment to a motor shaft of a lawn mower and a smooth circular rim adapted to be spaced from a housing of a lawn mower, said rotor body further having an upper surface and a smooth planar lower surface having no downwardly extending protuberances, a plurality of spaced cutting elements projecting radially outwardly from said rim during normal rotation of said rotor body by a motor of a lawn mower, pivot means between each said cutting element for unobstructed pivotable movement of each said element during normal rotation of said rotor body whereby uncuttable obstructions encountered by said cutting elements causes said elements to freely move about said pivot means, each said cutting element being a rigid member, said first leg being displaced angularly in plan from vertical alignment from said second leg to allow said first leg to be positioned through said passageway without material deformation of said hook member.

19. An improved lawn mower blade assembly adapted to rotate in a substantially horizontal plane about a vertically disposed motor shaft of a lawn mower comprising an enlarged circular rotor body having means for attachment to a motor shaft of a lawn mower and a smooth circular rim adapted to be spaced from a housing of a lawn mower, said rotor body further having an upper surface and a smooth planar lower surface having no downwardly extending protuberances, a plurality of spaced cutting elements projecting radially outwardly from said rim during normal rotation of said rotor body by a motor of a lawn mower, pivot means between each said element and adjacent said rim for freely mounting each said cutting element for unobstructed pivotable movement of each said element during normal rotation of said rotor body whereby uncuttable obstructions encountered by said cutting elements causes said elements to freely move about said pivot means, each said cutting element being a rigid member, said pivot means including a plurality of spaced radially elongated first passageways in said rotor body and adjacent said rim thereof and a plurality of spaced circular second passageways in said rotor body and adjacent said rim thereof, said first passageways disposed remote from said rim with respect to said second passageways, each said cutting element being elongated and having opposite end portions, one of said end portions including a hook member having a first leg and a second leg, said second leg being substantially greater in length than said first leg, said first leg engaging said upper surface of said rotor body when said cutting element is disposed within respective said first passageway and said rotor body is not being rotated for limiting the downward position of said other end portion of said cutting element, further including a connecting leg between said first and second legs, said connecting leg being sufficiently long to allow said second leg to be inclined upwardly from the plane of rotation of said rotor body, said second leg being allowed to be inclined upwardly a greater distance when said cutting element is disposed within said second passageway than when said cutting element is disposed within said first passageway for enhancing passage of said second leg over an object encountered by said cutting element to minimize damage to said second leg.

* * * * *

UNITED STATES PATENT AND TRADEMARK OFFICE
CERTIFICATE OF CORRECTION

PATENT NO. : 4,924,665

DATED : May 15, 1990

INVENTOR(S) : Gilbert Q. Crosley

It is certified that error appears in the above-identified patent and that said Letters Patent is hereby corrected as shown below:

On the title page:

Inventor name should read --Gilbert Q. Crosley--

Signed and Sealed this

Thirtieth Day of March, 1993

Attest:

STEPHEN G. KUNIN

*Attesting Officer*  *Acting Commissioner of Patents and Trademarks*